US011409061B2

(12) United States Patent
Kurokawa et al.

(10) Patent No.: US 11,409,061 B2
(45) Date of Patent: Aug. 9, 2022

(54) OPTICAL MODULE

(71) Applicant: Sumitomo Electric Industries, Ltd., Osaka (JP)

(72) Inventors: Munetaka Kurokawa, Osaka (JP); Masato Furukawa, Osaka (JP); Yasushi Fujimura, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/344,336

(22) Filed: Jun. 10, 2021

(65) Prior Publication Data
US 2021/0389531 A1  Dec. 16, 2021

(30) Foreign Application Priority Data
Jun. 12, 2020 (JP) .............................. JP2020-102414

(51) Int. Cl.
*H04B 10/00* (2013.01)
*G02B 6/42* (2006.01)
*F21V 8/00* (2006.01)
*G02B 6/12* (2006.01)

(52) U.S. Cl.
CPC ............ *G02B 6/425* (2013.01); *G02B 6/0083* (2013.01); *G02B 6/12011* (2013.01); *G02B 6/428* (2013.01)

(58) Field of Classification Search
CPC combination set(s) only.
See application file for complete search history.

(56) References Cited

U.S. PATENT DOCUMENTS

| 4,997,253 | A | * | 3/1991 | Enochs | G02B 6/4248 156/272.4 |
| 5,206,986 | A | * | 5/1993 | Arai | G02B 6/42 29/830 |
| 5,327,517 | A | * | 7/1994 | Yamada | G02B 6/30 385/50 |
| 5,412,748 | A | * | 5/1995 | Furuyama | G02B 6/4249 385/88 |
| 5,881,193 | A | * | 3/1999 | Anigbo | G02B 6/4244 385/94 |
| 6,112,002 | A | * | 8/2000 | Tabuchi | G02B 6/4245 385/124 |

(Continued)

FOREIGN PATENT DOCUMENTS

| JP | 2009-265188 A | 11/2009 |
| JP | 2017-032629 A | 2/2017 |
| WO | 2017/017965 A1 | 2/2017 |

*Primary Examiner* — Agustin Bello
(74) *Attorney, Agent, or Firm* — Baker Botts L.L.P.; Michael A. Sartori

(57) ABSTRACT

An optical module includes a base having a first surface, a board having a second surface and a third surface, an optical circuit element having a fourth surface, a fifth surface and two ports, and an array lens. The first surface is joined to the second surface by a first solder. The third surface has a first metallic pattern and a second metallic pattern that are joined to the fourth surface by a second solder. The array lens is fixed onto the first surface of the base so as to be optically coupled to the two ports provided at one end of the optical circuit element in the first direction. The first metallic pattern is formed closer than the second metallic pattern to the one end of the optical circuit element in the first direction and is formed between the two ports in the second direction.

7 Claims, 7 Drawing Sheets

(56) References Cited

U.S. PATENT DOCUMENTS

| | | | |
|---|---|---|---|
| 6,222,967 B1* | 4/2001 | Amano | G02B 6/424 |
| | | | 385/88 |
| 6,628,854 B1* | 9/2003 | Koh | G02B 6/4261 |
| | | | 385/129 |
| 9,366,835 B2* | 6/2016 | Masuyama | G02B 6/4295 |
| 9,684,126 B2* | 6/2017 | Fujimura | G02B 6/4286 |
| 9,696,496 B2* | 7/2017 | Masuyama | H01L 31/02327 |
| 10,331,007 B2* | 6/2019 | Yoneda | G02F 1/0353 |
| 10,651,948 B2* | 5/2020 | Kurokawa | G02B 6/4206 |
| 11,057,112 B1* | 7/2021 | Lin | G02B 6/4256 |
| 2001/0026665 A1* | 10/2001 | Ando | G02B 6/4201 |
| | | | 385/94 |
| 2001/0040240 A1* | 11/2001 | Tatoh | G02B 6/4257 |
| | | | 438/42 |
| 2002/0025123 A1* | 2/2002 | Fujimura | G02B 6/4245 |
| | | | 385/88 |
| 2002/0136522 A1* | 9/2002 | Karla | G02B 6/3636 |
| | | | 385/137 |
| 2003/0029051 A1* | 2/2003 | Epitaux | G02B 6/4237 |
| | | | 33/645 |
| 2003/0152338 A1* | 8/2003 | Kuhara | G02B 6/42 |
| | | | 398/164 |
| 2009/0297159 A1* | 12/2009 | Margolin | G02B 6/4251 |
| | | | 385/88 |
| 2010/0158436 A1* | 6/2010 | Riska | G02B 6/12 |
| | | | 438/118 |
| 2012/0327668 A1* | 12/2012 | Chan | G02B 6/4201 |
| | | | 362/362 |
| 2013/0011104 A1* | 1/2013 | Sato | G02B 6/4244 |
| | | | 385/93 |
| 2017/0031099 A1* | 2/2017 | Fujimura | G02B 6/12004 |
| 2017/0038541 A1* | 2/2017 | Fujimura | G02B 6/4225 |
| 2017/0131473 A1* | 5/2017 | Masuyama | H01L 31/02327 |
| 2018/0081118 A1* | 3/2018 | Klamkin | H01S 5/187 |
| 2018/0164516 A1* | 6/2018 | Lee | G02B 6/4246 |
| 2018/0172906 A1* | 6/2018 | Rothberg | G01M 11/35 |
| 2018/0284374 A1* | 10/2018 | Wang | H04B 10/505 |
| 2019/0086618 A1* | 3/2019 | Shastri | G02B 6/4269 |
| 2019/0129106 A1* | 5/2019 | Inoue | G02B 6/4214 |
| 2020/0064571 A1* | 2/2020 | Yoneda | G02B 6/125 |
| 2020/0073052 A1* | 3/2020 | Lin | G02B 6/4246 |
| 2021/0278614 A1* | 9/2021 | Kubo | G02B 6/4257 |
| 2021/0356683 A1* | 11/2021 | Zheng | H05K 1/00 |
| 2021/0389531 A1* | 12/2021 | Kurokawa | G02B 6/12011 |

* cited by examiner

OPTICAL MODULE

CROSS REFERENCE TO RELATED APPLICATIONS

This application claims priority based on Japanese Patent Application No. 2020-102414, filed on Jun. 12, 2020, and the entire contents of which are incorporated herein by reference.

TECHNICAL FIELD

The present disclosure relates to an optical module.

BACKGROUND

Patent Document 1 (Japanese Unexamined Patent Application Publication No. 2009-265188) discloses an optical module including PLC chips. The optical module includes a first PLC chip and a second PLC chip. The first PLC chip includes an input optical waveguide array, a VOA array, and an output optical waveguide. The second PLC chip includes an input optical waveguide array, an AWG, and an output optical waveguide. The input optical waveguide array of the first PLC chip is optically coupled to an optical fiber array located outside the optical module. The output optical waveguide of the second PLC chip is optically coupled to an optical fiber extending in a direction opposite to the optical fiber array. A board, a first mount, and a second mount are provided below the first PLC chip and the second PLC chip. The first mount and the second mount are both disposed on the board. The first mount is fixed to the board by a first fixing screw, and is fixed by a second fixing screw so as to be movable in a direction approaching or separating from the second mount. The second mount is fixed to the board by a third fixing screw, and is fixed by a fourth fixing screw to be movable in a direction approaching or separating from the first mount. The height of the first mount from the board is higher than the height of the second mount from the board. The first PLC chip is fixed on the first mount. The second PLC chip is disposed so as to be in non-contact with the second mount, and is held by the second mount through an elastic adhesive provided on the second mount.

Patent Document 2 (Japanese Unexamined Patent Application Publication No. 2017-32629) discloses an optical module including optical hybrid devices and a carrier on which the optical hybrid devices are mounted. Each of the optical hybrid device includes a semiconductor MMI coupler and a semiconductor optical waveguide extending from the MMI coupler. Signal-light and local-oscillation-light are input to the optical module. The input signal-light is distributed to each of the two optical hybrid devices. The input local-oscillation-light is distributed to each of the two optical hybrid devices in the same manner as the signal light. The optical hybrid devices are PD-integrated multimode hybrids using a semiconductor substrate. Each of the optical hybrid devices includes a photodiode (PD) configured to generate a photocurrent. The photocurrent generated by the PD is converted into a voltage signal by an amplifier provided outside the optical hybrid device. Each of the two optical hybrid devices has a signal-light port to which the signal-light is input and a local-oscillation-light port to which the local-oscillation-light is input. The signal-light port and the local-oscillation-light port of one of the two optical hybrid devices are optically coupled to a first lens system and a second lens system disposed inside the package of the optical module, respectively. The signal-light port and the local-oscillation-light port of the other of the two optical hybrid devices are optically coupled to a third lens system and a fourth lens system disposed inside the package of the optical module, respectively.

SUMMARY

An optical module according to an aspect of the present disclosure includes a base having a first surface; a board that has a flat-plate-like outer shape extending in a first direction and that has a second surface and a third surface located reverse to the second surface; an optical circuit element that has a flat-plate-like outer shape extending in the first direction and that has a fourth surface, a fifth surface located reverse to the fourth surface, and two ports arranged in a second direction crossing the first direction at one end of the fifth surface in the first direction; and an array lens in which two lenses are arranged in the second direction. The second surface of the board is joined to the first surface of the base by using a first solder. The third surface of the board includes a first metallic pattern and a second metallic pattern that are arranged in the first direction relative to each other. The fourth surface of the optical circuit element is joined to the first metallic pattern and the second metallic pattern by using a second solder. The array lens is fixed onto the first surface of the base so that one of the two lenses is optically coupled to one of the two ports of the optical circuit element and the other of the two lenses is optically coupled to the other of the two ports of the optical circuit element. When the two ports, the first metallic pattern, and the second metallic pattern are seen from a normal direction of the fifth surface, the first metallic pattern is formed closer than the second metallic pattern to the one end of the optical circuit element in the first direction and is formed between the two ports in the second direction.

DETAILED DESCRIPTION

Figure 1:
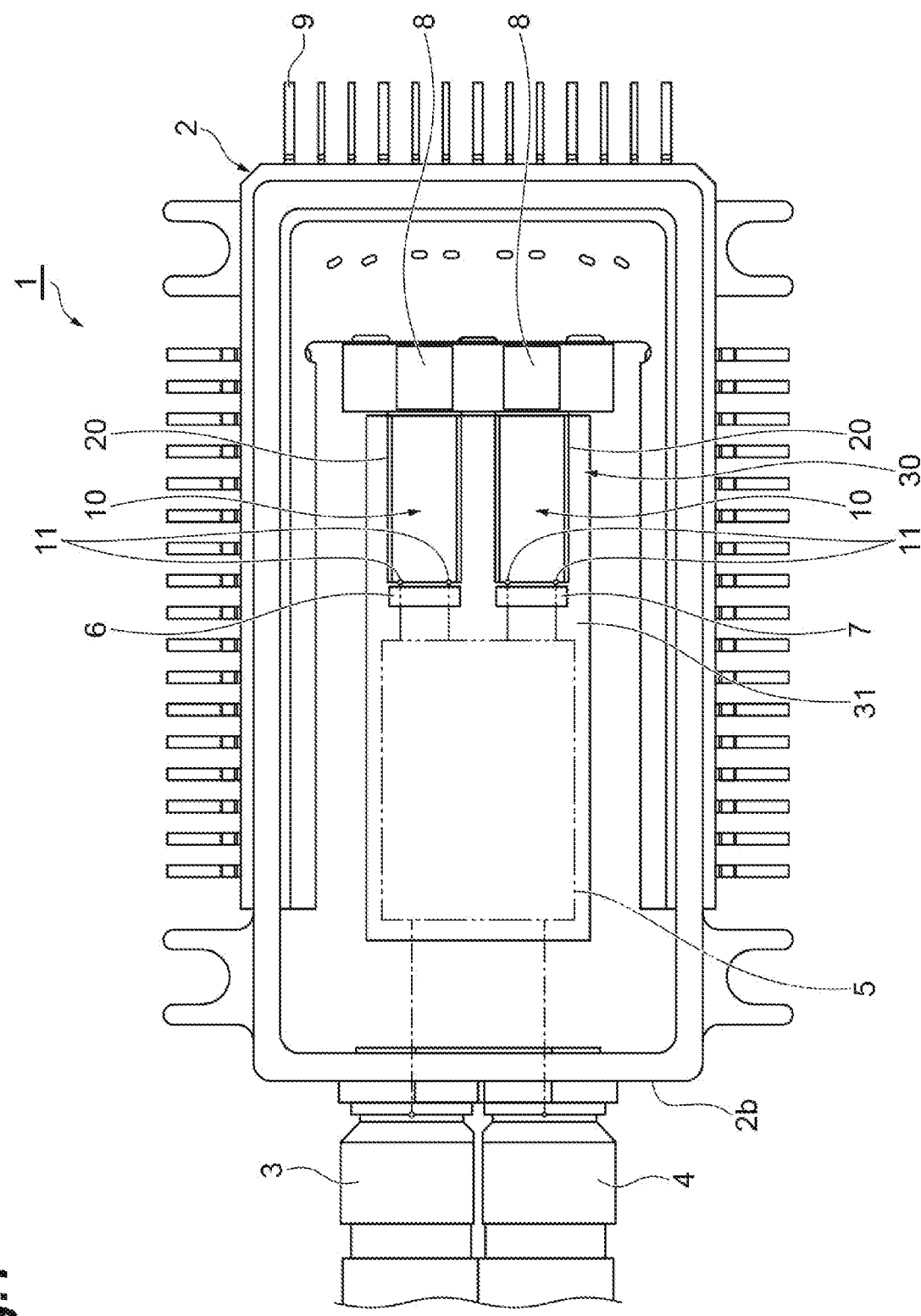
FIG. 1 is a plan view illustrating an internal structure of an optical module according to an embodiment.

An optical module according to an embodiment of the present disclosure includes a base having a first surface, a board that has a flat-plate-like outer shape extending in a first direction and that has a second surface and a third surface located reverse to the second surface, an optical circuit element that has a flat-plate-like outer shape extending in the first direction and that has a fourth surface, a fifth surface located reverse to the fourth surface, and two ports arranged in a second direction crossing the first direction at one end of the fifth surface in the first direction, and an array lens in which two lenses are arranged in the second direction. The second surface of the board is joined to the first surface of the base by using a first solder. The third surface of the board includes a first metallic pattern and a second metallic pattern that are arranged in the first direction relative to each other. The fourth surface of the optical circuit element is joined to the first metallic pattern and the second metallic pattern by using a second solder. The array lens is fixed onto the first surface of the base so that one of the two lenses is optically coupled to one of the two ports of the optical circuit element and the other of the two lenses is optically coupled to the other of the two ports of the optical circuit element. When the two ports, the first metallic pattern, and the second metallic pattern are seen from a normal direction of the fifth surface, the first metallic pattern is formed closer than the second metallic pattern to the one end of the optical circuit element in the first direction and is formed between the two ports in the second direction.

Details OF EMBODIMENTS OF THE PRESENT DISCLOSURE

Specific examples of an optical module according to the present disclosure will be described below with reference to the drawings. The present invention is not limited to the following examples, and is defined by Claims, and is intended to embrace all the modifications within the meaning and range of equivalency of the Claims. In the description of the drawings, like or corresponding elements are denoted by like reference numerals and redundant descriptions thereof will be omitted. In addition, the drawings are partially simplified for easy understanding, and dimensional ratios and the like are not limited to those illustrated in the drawings.

FIG. 1 is a plan view illustrating an internal structure of an optical module 1 according to the present embodiment. Optical module 1 includes a package 2 having a substantially rectangular parallelepiped shape, a signal-light input port 3, and a local-oscillation-light input port 4. Signal-light input port 3 and local-oscillation-light input port 4 are provided on one end face 2b of package 2. Signal-light input port 3 is connected to, for example, a single mode fiber outside package 2. For example, the single mode fiber supplies a received signal light to signal-light input port 3. Local-oscillation-light input port 4 is connected to a polarization-maintaining fiber outside package 2, for example. For example, the polarization-maintaining fiber supplies a local-oscillation-light to local-oscillation-light input port 4. Optical module 1 includes an optical component 5, a first array lens 6, a second array lens 7, and optical hybrid devices 10. Optical component 5 includes, for example, a collimating lens, a mirror, a variable optical attenuator, a half-wavelength plate (λ/2-plate), a skew-adjusting device, a polarizer, a beam splitter, and a power monitoring photodiode (monitoring PD). The signal-light inputted to signal-light input port 3 is distributed to first array lens 6 and second array lens 7 by optical component 5. The local-oscillation-light inputted to local-oscillation-light input port 4 is distributed to first array lens 6 and second array lens 7 by optical component 5. The signal-light and the local-oscillation-light distributed to first array lens 6 are converged by the respective lenses of first array lens 6 to enter one of optical hybrid devices 10. The signal-light and the local-oscillation-light distributed to second array lens 7 are converged by the respective lenses of second array lens 7 to enter the other optical hybrid device 10. For example, when the signal-light inputted to signal-light input port 3 is polarization-multiplexed, a first polarized component (X-polarized light) included in the signal-light is incident on one of optical hybrid devices 10 from optical component 5 via first array lens 6. A second polarized component (Y-polarized light) which is included in the signal-light and is orthogonal to the first polarized component is incident on the other optical hybrid device 10 from optical component 5 via first array lens 7. It should be noted that the X-polarized light and the Y-polarized light referred herein merely indicate that there are two kinds of polarized lights for convenience, and are not related to a X-axis direction and a Y-axis direction described later.

Optical hybrid device 10 is, for example, a PD-integrated multimode hybrid having a rectangular-plate-shape. The PD-integrated multimode hybrid includes a semiconductor substrate made of, for example, indium phosphide (also referred to as InP). A thickness of optical hybrid device 10 is 50 μm or greater and 200 μm or less, for example. A photocurrent is generated by PDs integrated in optical hybrid device 10. The photocurrent is converted into a voltage signal by, for example, an amplifier 8 provided outside optical hybrid device 10. Amplifier 8 is a transimpedance amplifier, for example. The voltage signal converted by amplifier 8 is output to the outside from any one of a plurality of terminals 9 of package 2. The plurality of terminals 9 are provided, for example, on an end face opposite to one end face 2b of package 2, and extend outward from package 2.

Figure 2:
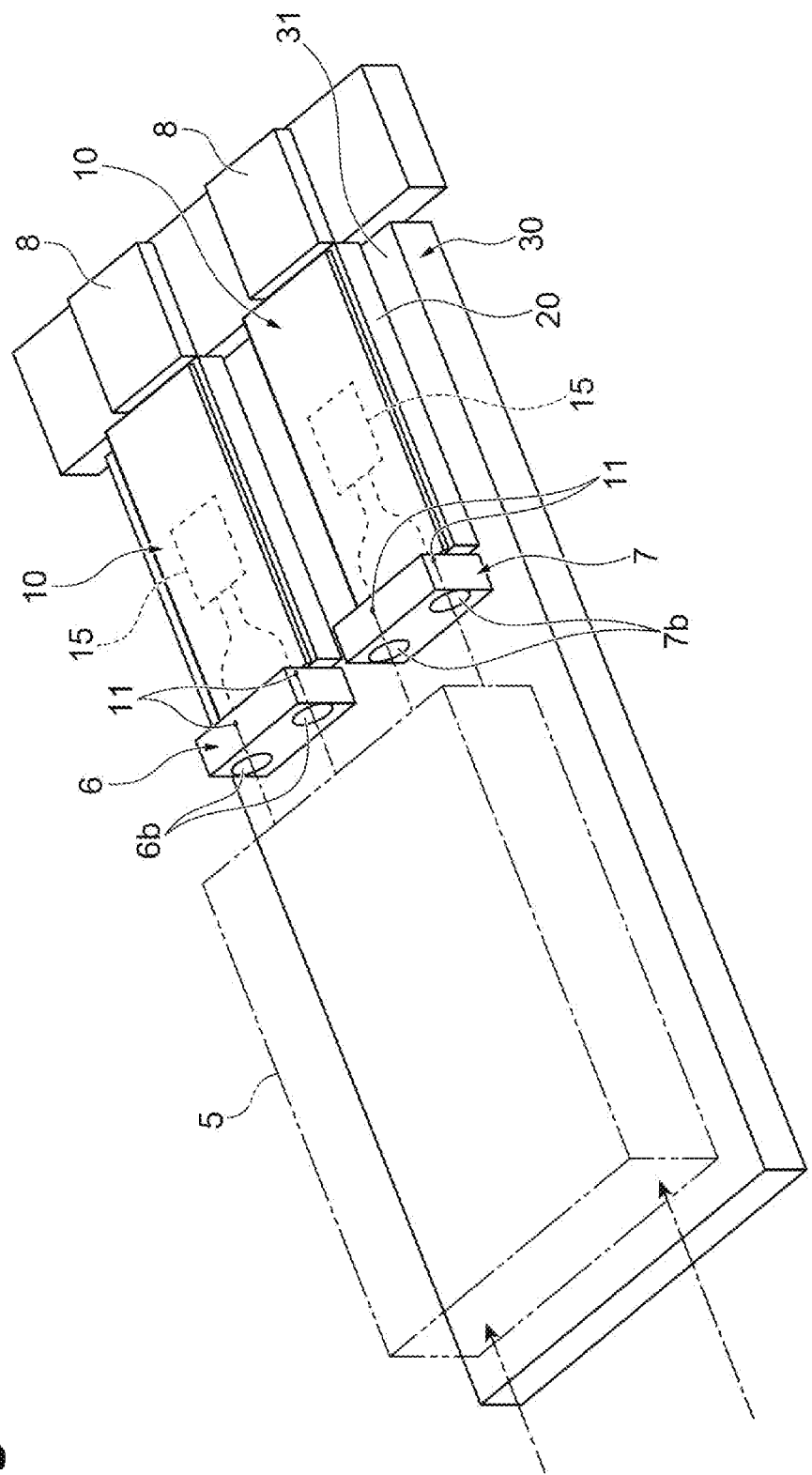
FIG. 2 is a perspective view illustrating an optical component, an array lens, and an optical circuit element of the optical module in FIG. 1.

FIG. 2 is a perspective view illustrating optical component 5, first array lens 6, second array lens 7, amplifier 8, and optical hybrid device 10. Optical hybrid device 10 is, for example, an optical circuit element including a 90-degree hybrid 15. The 90-degree hybrid 15 includes, for example, an MMI (Multi Mode Interference) coupler formed by a planar waveguide optically coupled to each of the signal-light and the local-oscillation-light. One optical hybrid device 10 includes two optical input ports 11 (ports). Each of two optical input ports 11 is optically connected to 90-degree hybrid 15 via a corresponding optical waveguide 14. The optical waveguide 14 is formed in optical hybrid device 10. That is, for example, a light inputted from first array lens 6 to optical input port 11 propagates through optical waveguide 14 and is inputted to 90-degree hybrid 15. More specifically, each of signal-light and local-oscillation-light is inputted to a corresponding port of two optical input ports 11, respectively. The 90-degree hybrid 15 generates four output lights (IP: In-Phase Positive, IN: In-Phase Negative, QP: Quadrature Positive, and QN: Quadrature Negative) from the input signal-light and the local-oscillation-light by interference and separation. The IP is a positive-phase optical signal of the 0-degree component of the received signal-light, and the IN is a negative-phase optical signal of the 0-degree component of the received signal-light. The QP is a positive-phase optical signal of the 90-degree component of the received signal-light, and the QN is a negative-phase optical signal of the 90-degree component of the received signal-light.

Figure 3:
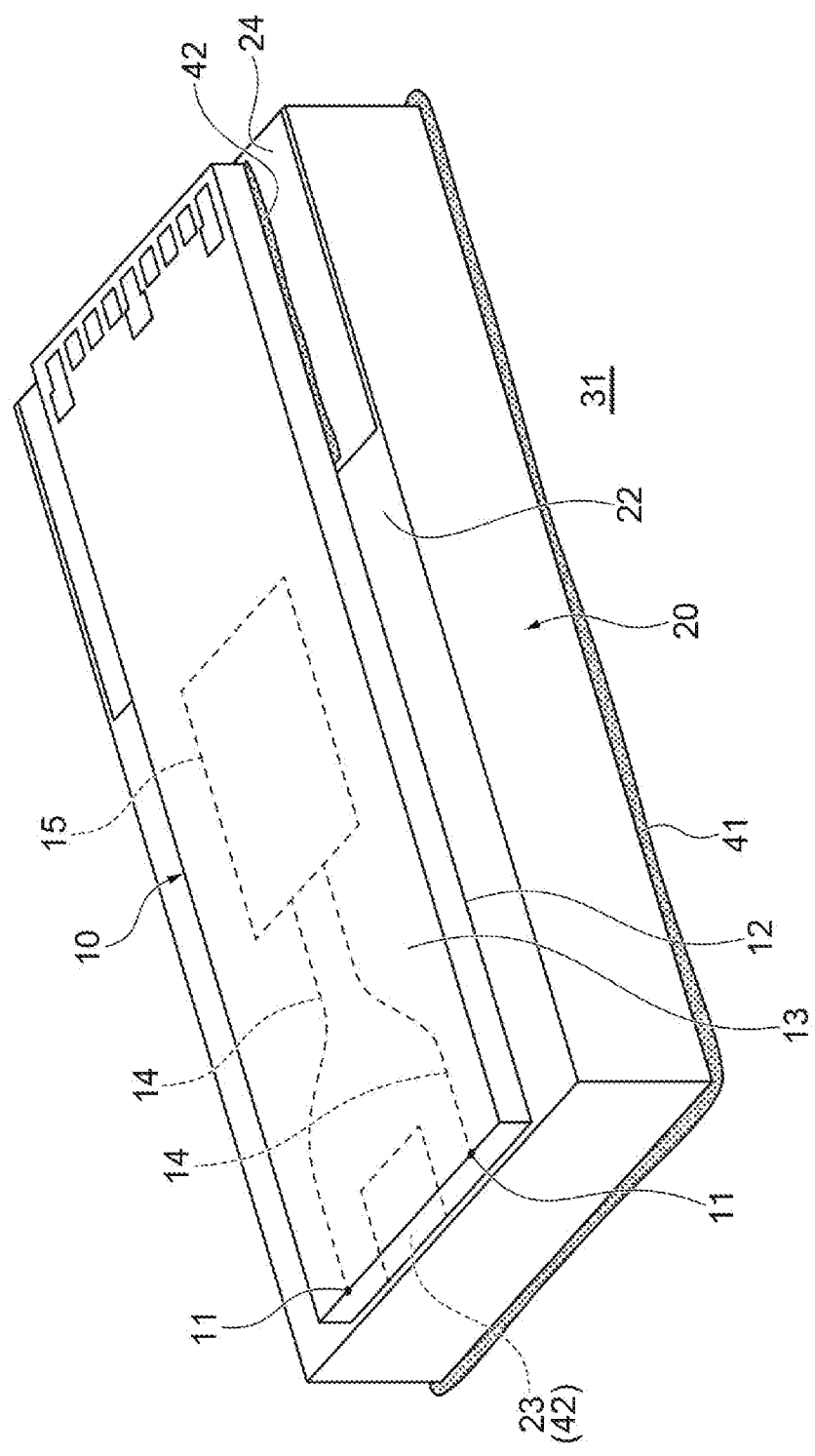
FIG. 3 is a perspective view illustrating the optical circuit element and a board in FIG. 2.

FIG. 3 is a perspective view illustrating a mounting state of optical hybrid device 10 mounted inside optical module 1. As illustrated in FIGS. 2 and 3, optical hybrid device 10 is mounted on a base 30 via a board 20. Board (plate) 20 may also be referred to as a carrier. Base 30 has a rectangular plate shape. For example, a thickness of base 30 is 1.0 mm or greater and 2.0 mm or less. The thickness of base 30 is greater than a thickness of optical hybrid device 10 and greater than a thickness of the board 20. Base 30 includes ceramic as a material, for example. Base 30 has a planar first surface 31 on which optical component 5, first array lens 6, second array lens 7, and board 20 are mounted. For example, when viewed from a normal direction of first surface 31, board 20 fits inside base 30, and optical hybrid device 10 fits inside board 20. That is, optical hybrid device 10 does not protrude (overhang) from board 20 in a direction parallel to first surface 31. For example, when optical hybrid device 10 overhangs from board 20, the overhung portion is not supported by board 20, and the space between the overhung portion and first surface 31 is hollow. Since optical component 5 is mounted on first surface 31 of base 30 in addition to the board 20, an area of first surface 31 is greater than an area of a surface of board 20 (for example, a second surface 21 and a third surface 22 described below) parallel to first surface 31. Accordingly, the thickness of base 30 is greater than that of optical hybrid device 10, and the area of first surface 31 is greater than that of board 20. Base 30 has a rectangular plate shape.

First array lens 6 has two lenses 6b, for example. Two lenses 6b face the respective ports of two optical input ports 11 of one optical hybrid device 10 in a longitudinal direction of optical hybrid device 10. The longitudinal direction of optical hybrid device 10 is, for example, the same as an optical axis direction of the light inputted to optical input ports 11. Second array lens 7 has two lenses 7b. Two lenses 7b face the respective ports of two optical input ports 11 of the other optical hybrid device 10 in the longitudinal direction of optical hybrid device 10. First array lens 6 is fixed onto first surface 31 of base 30 so that two lenses 6b are optically coupled to the respective ports of two optical input ports 11 of the one optical hybrid device 10. For example, two lenses 6b are arranged side by side in a direction (for example, a Y-axis direction described later) crossing the longitudinal direction (for example, an X-axis direction described later) of optical hybrid device 10. For example, two lenses 7b are arranged side by side in the same direction as two lenses 6b. A distance between two lenses 6b is set to be the same as the distance between two optical input ports 11. The distance mentioned here is, for example, a distance between the respective central axes of two lenses 6b. The central axis is also referred to as an optical axis. The distances (heights) of the optical axes of two lenses 6b from first surface 31 of base 30 are set and adjusted to be the same as the distances (heights) of optical input ports 11 from first surface 31. The distances (heights) of optical axes of two lenses 7b from first surface 31 of base 30 are also set and adjusted in the same manner as the distances (heights) of the optical axes of two lenses 6b from first surface 31 of base 30. First array lens 6 and second array lens 7 include glass or silicon as a material, for example. Since first array lens 6 and second array lens 7 can have the same configuration as each other, for example, first array lens 6 and second array lens 7 will be collectively referred to as an array lens 6, 7 in the following description.

Figure 4:
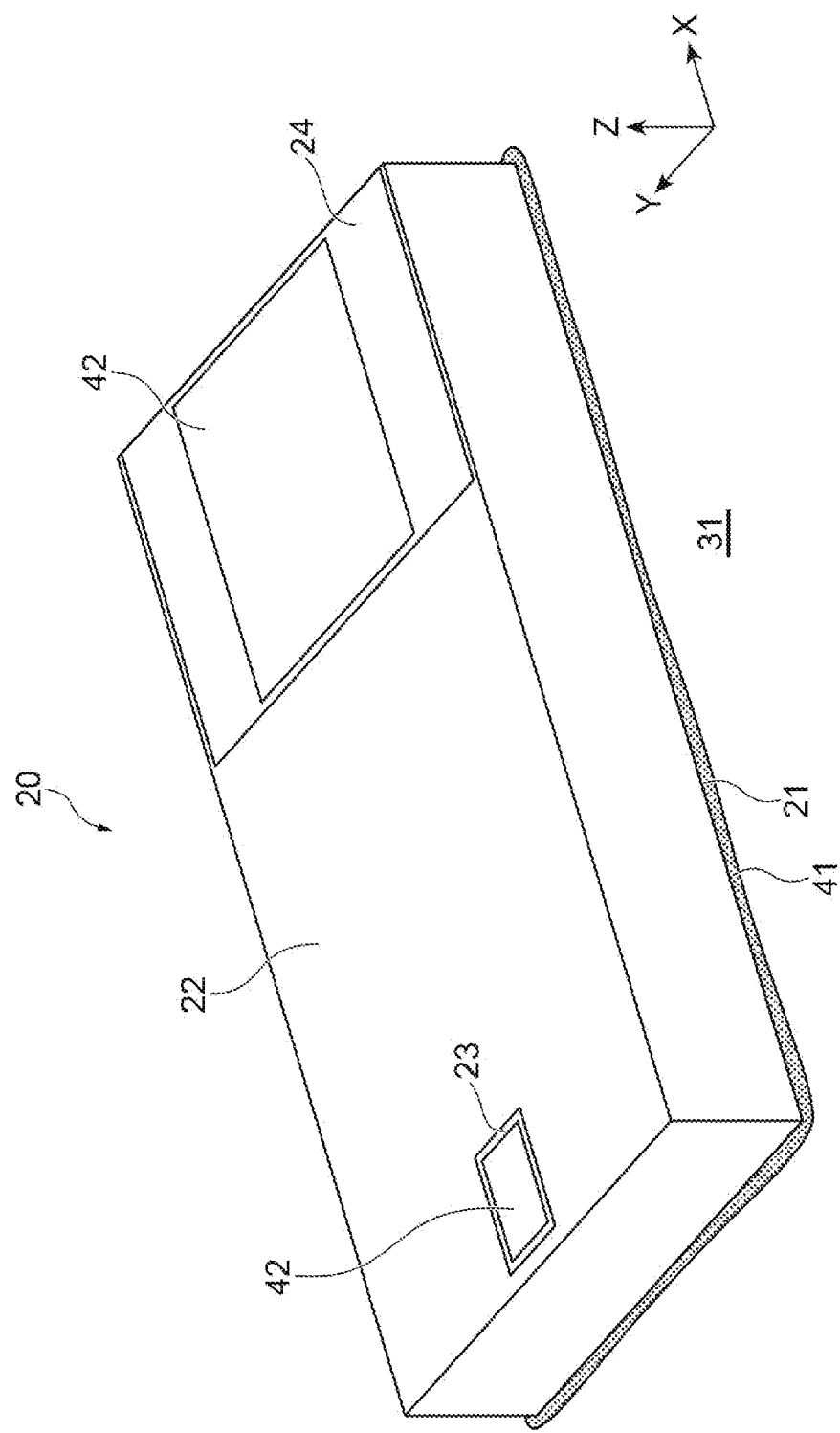
FIG. 4 is a perspective view illustrating the board in FIG. 3.

FIG. 4 is a perspective view of board 20. As illustrated in FIGS. 3 and 4, board 20 has a rectangular plate shape. For example, a thickness of board 20 is 300 µm or greater and 600 µm or less. The thickness of board 20 corresponds to, for example, a dimension in a direction having the smallest value among the respective external dimensions in longitudinal, lateral, and height directions. For example, the thickness of board 20 corresponds to the height of board 20. The longitudinal direction corresponds to a direction in which the external dimension is largest among three directions of vertical, lateral, and height directions. Board 20 includes aluminum nitride (AlN) as a material, for example. Board 20 has a planar second surface 21 and a planar third surface 22 reverse to second surface 21. Second surface 21 is joined to first surface 31 of base 30 via a first solder 41. Although first solder 41 is not included in board 20, first solder 41 is depicted in FIG. 4 to illustrate board 20 in a mounting state. When board 20 is joined to base 30, first solder 41 may be formed to be deposited on first surface 31 of base 30. First solder 41 may be in a creamy form and may be applied to first surface 31 of base 30 to be formed in a predetermined shape. First solder 41 is melted by heating. Heating for joining board 20 to base 30 will be described later. For example, third surface 22 of board 20 is a plane parallel to second surface 21. The thickness of board 20 corresponds to, for example, a distance between second surface 21 and third surface 22. Optical hybrid device 10 is joined to third surface 22 via a second solder 42.

Each of first solder 41 and second solder 42 includes a gold-tin (AuSn) alloy, for example. In this case, linear expansion coefficients of first solder 41 and second solder 42 are $17.5 \times 10^{-6}$ (/K), for example. Optical hybrid device 10 has a metallized planar fourth surface 12 and a fifth surface 13 reverse to fourth surface 12 (see FIG. 3). Fourth surface 12 is joined to third surface 22 of board 20 via second solder 42. For example, fifth surface 13 is a plane parallel to fourth surface 12. Third surface 22 of board 20 includes a first metallic pattern 23 and a second metallic pattern 24.

First metallic pattern 23 and second metallic pattern 24 are both formed of metals. First metallic pattern 23 and second metallic pattern 24 may contain, for example, at least one of titanium (Ti), platinum (Pt), or gold (Au), or may contain alloys thereof. Second surface 21 of board 20 may also be metallized with, for example, at least one of titanium (Ti), platinum (Pt), or gold (Au), or may be metallized with alloys thereof. As illustrated in FIG. 3, in the longitudinal direction of board 20, first metallic pattern 23 is formed at a position closer than second metallic pattern 24 to two optical input ports 11. That is, in the longitudinal direction of board 20, the distance between first metallic pattern 23 and optical input ports 11 is shorter than the distance between second metallic pattern 24 and optical input ports 11. In addition, first metallic pattern 23 is formed closer than second metallic pattern 24 to one end (for example, on a side where optical input ports are provided) of optical hybrid device 10 in the longitudinal direction, and second metallic pattern 24 is formed closer than first metallic pattern 23 to the other end (for example, on a side reverse to the side where optical input ports are provided) of optical hybrid device 10 in the longitudinal direction.

Second solder 42 is formed by a deposition on each of first metallic pattern 23 and second metallic pattern 24 in accordance with a shape of optical hybrid device 10. When optical hybrid device 10 is joined to board 20, second solder 42 may be in a creamy form and may be applied on first metallic pattern 23 and second metallic pattern 24 in predetermined shapes. For example, second solder 42 may be a solder cream, and the solder cream may be coated on first metallic pattern 23 and second metallic pattern 24 through metal masks. Second solder 42 is melted by heating. The heating of first solder 41 and second solder 42 is performed, for example, by bringing a heat conductive member (heating jig) made of metals into contact with a portion close to first solder 41 or second solder 42 of each of base 30, board 20, and optical hybrid device 10 and by heating the heat conductive member to conduct heat through the contact portion. As long as first solder 41 and second solder 42 can be melted, only predetermined portions of base 30 and board 20 may be heated. First solder 41 is heated to melt, and then cooled to solidify. Second surface 21 of board 20 is joined to first surface 31 of base 30 by the solidified first solder 41. Second solder 42 is heated to melt, and then cooled to solidify. Each of first metallic pattern 23 and second metallic pattern 24 is joined to fourth surface 12 of optical hybrid device 10 by the solidified second solder 42. Fourth surface 12 of optical hybrid device 10 is joined to each of first metallic pattern 23 and second metallic pattern 24.

Although second solder 42 melts and spreads in the X-axis direction and the Y-axis direction on fourth surface 12, it is preferable that the shape of the solidified second solder 42 fits inside first metallic pattern 23 when viewed from the normal direction (Z-axis direction). When a length (width) W2 of second metallic pattern 24 in the Y-axis direction is greater than a length (width) W4 of optical hybrid device 10 in the Y-axis direction, second solder 42 may be deposited (or applied) so as to include an region (overlapping region) in which fourth surface 12 and second metallic pattern 24 overlap when viewed from the Z-axis direction. Second solder 42 applied to the overlapping region spreads wider than the overlapping region when melted and joined to fourth surface 12. Therefore, in a portion where second metallic pattern 24 is joined to fourth surface 12 via second solder 42, second solder 42 is wider than the overlapping region. Therefore, a length (width) W3 in the Y-axis direction of the joined (solidified) second solder 42 on second metallic pattern 24 is greater than width W4 in the Y-axis direction of optical hybrid device 10. For example, width W3 may be greater than width W4 by 100 μm or more. For example, the solidified second solder 42 may be greater outward than optical hybrid device 10 by 50 μm or greater at both ends of second solder 42 in the Y-axis direction, respectively. Therefore, in a state where optical hybrid device 10 is joined to board 20, width W3 of second solder 42 on second metallic pattern 24 is smaller than width W2 of second metallic pattern 24, and width W4 of optical hybrid device 10 is smaller than width W3.

The melted first solder 41 solidifies when heating is stopped and the temperature is lowered, and board 20 is firmly fixed onto base 30. The melted second solder 42 is solidified when the heating is stopped and the temperature is lowered, and optical hybrid device 10 is firmly fixed onto board 20. In a state where optical hybrid device 10 is joined to board 20, a thickness of second solder 42 is 5 μm or greater and 10 μm or less, for example. This thickness corresponds to the distance from first metallic pattern 23 and second metallic pattern 24 to fourth surface 12 of optical hybrid device 10 when optical hybrid device 10 is joined to board 20.

When optical hybrid device 10 is joined to board 20, since second solder 42 is heated and then cooled, for example, a temperature change from 280° C., which is the melting point of AuSn, to 25° C., which is room temperature, is involved. As described above, when optical hybrid device 10 is formed of InP and board 20 is formed of alumina, a linear expansion coefficient of optical hybrid device 10 is $4.5 \times 10^{-6}$ (/K), for example, and a linear expansion coefficient of board 20 is $7.2 \times 10^{-6}$ (/K), for example. Therefore, in the case where the distance between the two optical input ports 11 is 0.5 mm, when the temperature of optical hybrid device 10 and board 20 changes from 280° C. to 25° C., a change in the distance between two optical input ports 11 is expressed to be as follows.

$$(7.2-4.5) \times 10^{-6} \times 0.5 (mm) \times (280-25) = -0.34 (\mu m)$$

As a result, the distance between two optical input ports 11 is reduced by 34 μm. The heating for melting first solder 41 and second solder 42 is usually performed so that the temperature is higher than the melting point.

Here, when a difference in linear expansion coefficient is Δa, a distance between two optical input ports 11 is L, a temperature difference between the melting point of second solder 42 and room temperature (25° C.) is ΔT, and a contraction amount of the distance between two optical input ports 11 due to a temperature change from the melting point of second solder 42 to room temperature is ΔL, ΔL is expressed by the following equation.

$$\Delta L = \Delta a \times L \times \Delta T$$

When ΔL is large, the optical coupling between two optical input ports 11 and array lens 6, 7 may be deteriorated. For example, when one of two lenses 6b is aligned with one of two optical input ports 11, if the distance between two lenses 6b is hardly affected by the temperature change described above, the optical axis of the other lens of two lenses 6b and the optical axis of other port of two optical input ports 11 may deviate from each other by ΔL, and an efficiency of the optical coupling may decrease. On the other hand, optical hybrid device 10 and board 20 according to the present embodiment can solve the above problem, and it is possible to reduce the coupling loss due to the temperature change during melting and solidifying first solder 41 and second solder 42 with respect to the optical coupling between array lens 6, 7 and optical hybrid device 10, to be, for example, less than −0.3 dB, which is an allowable value of the coupling loss.

Figure 5:
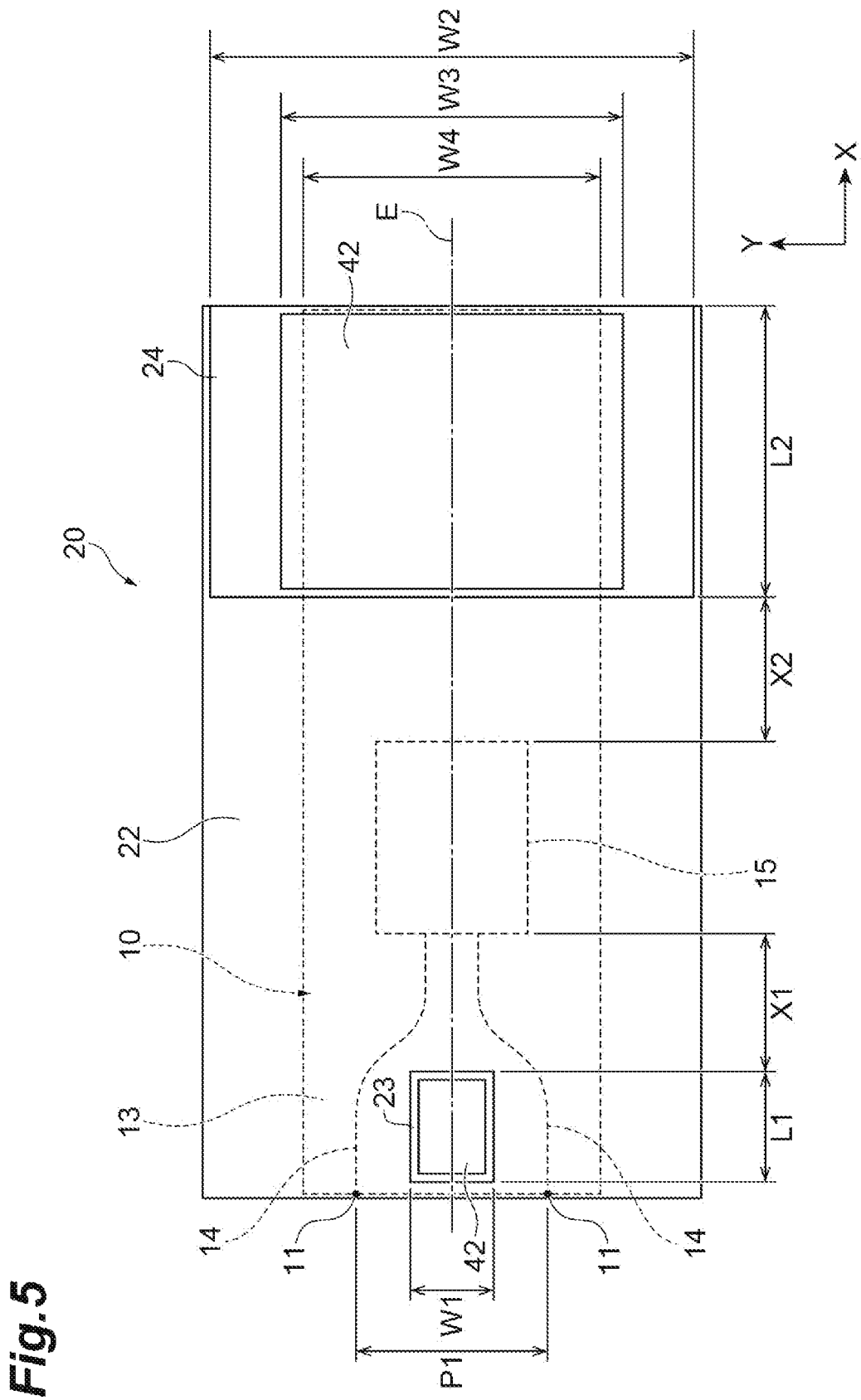
FIG. 5 is a plan view illustrating the board in FIG. 3.

FIG. 5 is a plan view illustrating board 20 as viewed from optical hybrid device 10 in a direction normal to third surface 22 of board 20. In FIG. 5, optical hybrid device 10 mounted on board 20 is indicated by a broken line. Hereinafter, as illustrated in FIGS. 4 and 5, the longitudinal direction of optical hybrid device 10 and board 20 is defined as an X-axis direction (first direction), a lateral (width) direction of board 20 is defined as a Y-axis direction (second direction), and a height (thickness) direction of board 20 is defined as a Z-axis direction. The positional relationship of each part of optical module 1 when viewed from the normal direction (Z-axis direction) of fifth surface 13 of optical hybrid device 10 will be described. For example, a length of optical hybrid device 10 in the X-axis direction is 2.0 mm or greater and 5.0 mm or less. The width of optical hybrid device 10 in the Y-axis direction is 1.0 mm or greater and 3.0 mm or less. In the plan view illustrated in FIG. 5, first metallic pattern 23 and second metallic pattern 24 are formed at positions away from 90-degree hybrid 15 included in optical hybrid device 10 in the X-axis direction.

First metallic pattern 23 is formed in a negative direction (toward optical component 5 in FIG. 2) along the X-axis with respect to 90-degree hybrid 15, and second metallic pattern 24 is formed in a positive direction (toward amplifier 8 in FIG. 2) along the X-axis (longitudinal direction) with respect to 90-degree hybrid 15. That is, first metallic pattern 23 and second metallic pattern 24 are formed such that 90-degree hybrid 15 is disposed between first metallic pattern 23 and second metallic pattern 24 in the longitudinal direction (X-axis direction). As described above, when first metallic pattern 23 and second metallic pattern 24 of board 20 are formed away from 90-degree hybrid 15, it is possible to reduce a residual stress applied to 90-degree hybrid 15 due to a temperature change caused by joining optical hybrid device 10 to first metallic pattern 23 and second metallic pattern 24. When a distance in the X-axis direction between first metallic pattern 23 and 90-degree hybrid 15 is defined as a distance X1, and a distance in the X-axis direction between second metallic pattern 24 and 90-degree hybrid 15 is defined as a distance X2, the greater the distances X1 and X2, the greater the effect of reducing the residual stress applied to 90-degree hybrid 15. The distances X1 and X2 are preferably 0.2 mm or greater, for example.

When board 20 is viewed from the Z-axis direction, first metallic pattern 23 is formed between two optical input ports 11 in the Y-axis direction (second direction). Two optical input ports 11 are arranged in the Y-axis direction. For example, two optical input ports 11 may be arranged so as to be line symmetrical to each other with respect to a reference line E of optical hybrid device 10. The reference line E is an imaginary line that passes through the center of optical hybrid device 10 in the Y-axis direction and extends in the X-axis direction. For example, the reference line E is the center line of optical hybrid device 10 in the Y-axis direction. The reference line E may be a straight line (virtual line) extending in the X-axis direction in third surface 22 and crossing first metallic pattern 23 and second metallic pattern 24. When the distance (pitch) between two optical input ports 11 arranged in the Y-axis direction is P1 and a width of first metallic pattern 23 in the Y-axis direction is W1, for example, W1 is 20% or greater and 80% or less of P1. As an example, P1 is 0.5 mm, and W1 is 0.1 mm or greater and 0.4 mm or less. It is preferable that width W1 of first metallic pattern 23 in the Y-axis direction is small from the viewpoint of suppressing a change in the distance between two optical input ports 11 due to the temperature change caused by the melting and solidification of second solder 42 described above. However, it is preferable that width W1 of first metallic pattern 23 in the Y-axis direction is not too small from the viewpoint of suppressing a warpage in the Z-axis direction which may occur in optical input ports 11. For example, the thickness of optical hybrid device 10 is 50 μm or more and 200 μm or less, and is relatively thin, so that optical hybrid device 10 may be warped in the Z-axis direction by receiving a stress due to the temperature change. When such a warpage causes a variation between the positions (heights) of array lens 6 and 7 from first surface 31 in the Z-axis direction and the positions (heights) of optical input ports 11 from first surface 31 in the Z-axis direction, the coupling loss increases. Therefore, the present inventors have found that the warpage of optical hybrid device 10 can be suppressed by disposing first metallic pattern 23 between two optical input ports 11.

When first metallic pattern 23 has a length L1 in the X-axis direction, length L1 is determined by distance X1 between first metallic pattern 23 and 90-degree hybrid 15, and a position of 90-degree hybrid 15 in optical hybrid device 10 in the X-axis direction. For example, length L1 is 0.3 mm or greater and 0.6 mm or less. Optical input ports 11 and 90-degree hybrid 15 are connected via two optical waveguides 14. In the portion where two optical waveguides 14 are connected to 90-degree hybrid 15, the distance between two optical waveguides 14 in the Y-axis direction is smaller than the distance between two optical input ports 11. Therefore, two optical waveguides 14 become closer to each other as heading from two optical input ports 11 toward 90-degree hybrid 15. Length L1 of first metallic pattern 23 is set so that first metallic pattern 23 is spaced apart at a predetermined distance or greater from portions in which two optical waveguides 14 bend so as to be closer to each other.

Second metallic pattern 24 has a rectangular shape, for example. Length (width) W2 of second metallic pattern 24 in the Y-axis direction may be greater than length (width) W4 of optical hybrid device 10 in the Y-axis direction. When board 20 is viewed from the Z-axis direction, the portion where optical hybrid device 10 and second metallic pattern 24 overlap each other is joined by second solder 42. A length L2 of second metallic pattern 24 in the X-axis direction is determined by distance X2 between second metallic pattern 24 and 90-degree hybrid 15, and the position of 90-degree hybrid 15 in optical hybrid device 10 in the X-axis direction. For example, length L2 is 0.3 mm or greater. Length L2 may be 0.6 mm or less, for example, as well as length L1. Second metallic pattern 24 may have at least a region that overlaps with optical hybrid device 10 describe above when board 20 is viewed from the Z-axis direction, and the shape of a portion that does not overlap with optical hybrid device 10 may not extend to a vicinity of the edge of board 20 in the Y-axis direction. The shape of the portion of second metallic pattern 24 that does not overlap optical hybrid device 10 may not be rectangular. For example, two sides of second metallic pattern 24 parallel to the X-axis direction may be inclined in the X-axis direction, and second metallic pattern 24 may have a trapezoidal shape including such two sides.

(Modification)

Figure 6:
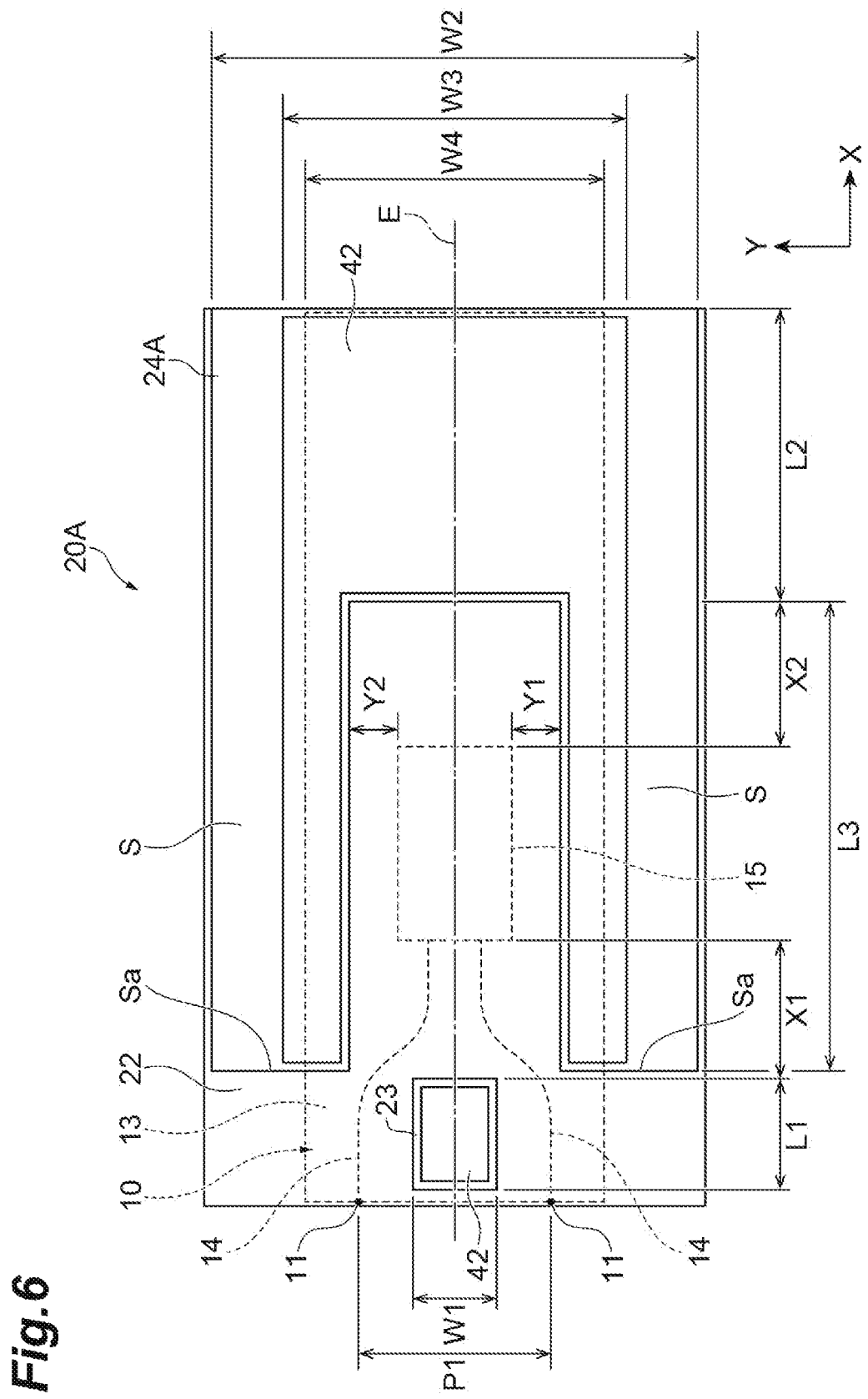
FIG. 6 is a plan view illustrating a modification of the board in FIG. 3

Next, a modification of the present embodiment will be described. The modification of the present embodiment has a board 20A instead of board 20 in the present embodiment described above. Board 20A differs from board 20 in that board 20A has a second metallic pattern 24A instead of second metallic pattern 24. Board 20A is also referred to as a carrier. Hereinafter, differences from the present embodiment described above will be mainly described. As illustrated in FIG. 6, second metallic pattern 24A of board 20A has a U-shape that is opened to a direction toward an optical component 5 and that has a portion which does not overlap with an optical hybrid device 10 in FIG. 2 when viewed from the Z-axis direction. That is, second metallic pattern 24A further includes a side portion S that extends in the X-axis direction toward optical component 5 from both ends of second metallic pattern 24 in the Y-axis direction, as compared to second metallic pattern 24. The shape of a second solder 42 formed on second metallic pattern 24 includes an overlapping region, described later, that overlaps with optical hybrid device 10 also in side portion S when viewed from the Z-axis direction, so that second solder 42 has a U-shape.

Side portion S has a region (overlapping region) which overlaps with optical hybrid device 10 when board 20A is viewed from the Z-axis direction. The overlapping region is joined to a fourth surface 12 of optical hybrid device 10 via second solder 42. Therefore, in second metallic pattern 24A, a portion overlapping with optical hybrid device 10 has a U-shape when viewed from the Z-axis direction. The U-shaped portion is joined to fourth surface 12 of optical hybrid device 10 via second solder 42. An end Sa closer to optical component 5 of side portion S extends to, for example, a position of a side of first metallic pattern 23 closer to an amplifier 8 in the X-axis direction. When board 20A is viewed from the Z-axis direction, a 90-degree hybrid 15 is located in a region surrounded by the U-shaped portion of second metallic pattern 24A. The U-shaped portion of second metallic pattern 24A is formed so as to surround 90-degree hybrid 15 except in a direction toward a first metallic pattern 23. Therefore, the region of a fourth surface 12 corresponding to 90-degree hybrid 15 is not joined to second metallic pattern 24A. Side portion S is separated from 90-degree hybrid 15 by distances Y1 and Y2 in the Y-axis direction. For example, side portion S is separated from 90-degree hybrid 15 by distance Y1 in a negative direction along Y-axis with reference to the reference line E.

Side portion S is separated from 90-degree hybrid 15 by distance Y2 in a positive direction along Y-axis with reference to the reference line E. Alternatively, side portion S is formed so as to sandwich 90-degree hybrid 15 therebetween at distances Y1 and Y2 in the Y-axis direction. As distances Y1 and Y2 increase, the effect of relaxing a stress on 90-degree hybrid 15 increases. Distances Y1 and Y2 are preferably 0.2 mm or greater, for example. Distance Y1 may be set to be the same as distance Y2.

Figure 7:
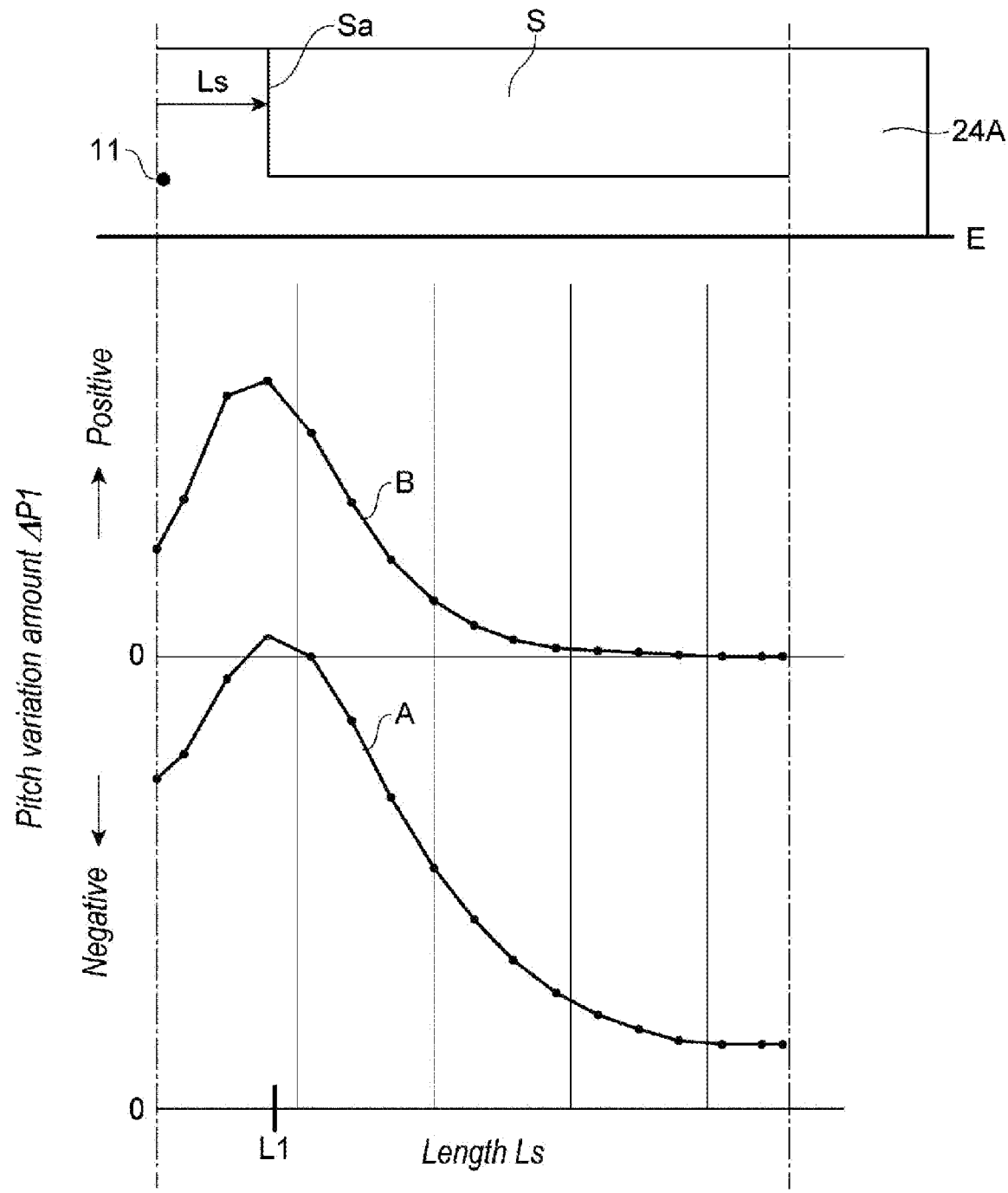
FIG. 7 is a diagram illustrating a relationship between length of a side portion of a second metallic pattern in the board and a variation amount of an distance between two ports due to a temperature change.

FIG. 7 is a diagram illustrating a relationship between length of side portion S of second metallic pattern 24A of board 20A and variation amount of a distance (pitch) between optical input ports 11 due to a temperature change. FIG. 7 is based on a simulation result of the variation amount (hereinafter referred to as a pitch variation amount) of the distance (pitch) between two optical input ports 11 due to the temperature change described above in a state where optical hybrid device 10 is fixed onto a third surface 22 of board 20A by second solder 42. A horizontal axis of the graph in FIG. 7 represents a length Ls from the end closer to optical component 5 of board 20A to end Sa of second metallic pattern 24A in the X-axis direction. Length Ls is equal to, for example, a distance from two optical input ports 11 to end Sa of side portion S of second metallic pattern 24A in the longitudinal direction (X-axis direction). Side portion S has the longest length L3 when Ls=0. On the other hand, when length Ls increases and reaches a maximum value, length L3 of side portion S becomes zero (when length L3 is zero, second metallic pattern 24A is the same as second metallic pattern 24).

A vertical axis of the graph in FIG. 7 represents the pitch variation amount ΔP1 of two optical input ports 11. Pitch variation amount ΔP1 of zero means that a pitch P1 does not vary when the temperature of board 20A changes from 280° C. to room temperature (25° C.). The area below a line of ΔP1=0 indicates that ΔP1 is negative, and pitch P1 becomes smaller, that is, becomes narrower in response to the temperature change. The area above the line of ΔP1=0 indicates that ΔP1 is positive, and pitch P1 increases, that is, becomes wider in response to the temperature change. It is preferable that the absolute value of pitch variation amount ΔP1 is smaller.

A curve A shows the result of a case in which board 20A is joined to fourth surface 12 of optical hybrid device 10 by first metallic pattern 23 and second metallic pattern 24A. A curve B shows the result of a case (comparative example) in which first metallic pattern 23 is removed from board 20A and only second metallic pattern 24A is joined to fourth surface 12 of optical hybrid device 10. When viewed from the Z-axis direction, side portion S has a region that overlaps with optical hybrid device 10. The shape of the overlapping region between second metallic pattern 24A and optical hybrid device 10 is a U-shape whose open end is directed toward optical input ports 11. Therefore, second solder 42 formed on second metallic pattern 24A is formed in a U-shape so as to include the overlapping region having the U-shape. For example, length (width) W3 in the Y-axis direction of second solder 42 formed on second metallic pattern 24A is greater than length (width) W4 in the Y-axis direction of optical hybrid device 10. In addition, width W3 is smaller than length (width) W2 in the Y-axis direction of second metallic pattern 24A. A length (width) in the Y-axis direction of the overlapping region between side portion S and optical hybrid device 10 may be 50 μm or greater, for example.

Both curve A and curve B show that pitch variation amount ΔP1 changes with a change in length Ls. This is due to the fact that the residual stress that is applied to optical input ports 11 due to the temperature change is changed in response to a change in length L3 at which side portion S is joined to optical hybrid device 10. In both curve A and the curve B, as length Ls increases from zero, pitch variation amount ΔP1 once increases, and then deceases when length Ls becomes greater than length L1 of first metallic pattern 23. Curve B shows that ΔP1 remains positive, and when length Ls is maximized, ΔP1 becomes zero. This is because a portion closer to optical component 5 of optical hybrid device 10 is not joined to board 20A and is in a floating state in the hollow, and thus is not affected by the residual stress. However, in this state, since optical hybrid device 10 is not firmly fixed onto board 20A, this state cannot be actually achieved.

Curve A is located in the negative area overall compared to curve B. In curve A, as length Ls is made smaller than a maximum value (corresponding to the case where there is no side portion S), pitch variation amount ΔP1 approaches zero, and the absolute value becomes smaller. When length Ls is set to a value near length L1 of first metallic pattern 23, pitch variation amount ΔP1 can be zero. Therefore, pitch variation mount ΔP1 can be minimized by setting length L3 of side portion S to an appropriate value. For example, the absolute value of pitch variation amount ΔP1 can be reduced by adjusting length Ls within a range of 0.5 to 1.5 times length L1 in the longitudinal direction (X-axis direction) of first metallic pattern 23.

Next, effects obtained by optical module 1 according to the present embodiment will be described in detail. In optical module 1, second surface 21 of board 20 is placed on planar first surface 31 of base 30, and fourth surface 12 of optical hybrid device 10 is placed on third surface 22 reverse to second surface 21 of board 20. First metallic pattern 23 is formed on third surface 22 of board 20, and first metallic pattern 23 is joined to fourth surface 12 of optical hybrid device 10 by second solder 42. Optical hybrid device 10 includes two optical input ports 11 arranged in the Y-axis direction. Each of two optical input ports 11 is optically coupled to each of lenses 6b and 7b of array lens 6, 7 which are fixed onto first surface 31 of base 30. Here, the optical coupling represents, for example, a state in which light incident on lens 6b from optical component 5 is converged on a corresponding port of optical input ports 11 by lens 6b, and an intensity of the light inputted to optical input port is equal to or greater than a predetermined value against an intensity of the light incident on lens 6b from optical component 5. A ratio (percentage) of the intensity of the light inputted to the optical input port to the intensity of the light incident on lens 6b from optical component 5 is, expressed by a coupling efficiency, for example. Since a loss (coupling loss) decreases as the coupling efficiency increases, the coupling efficiency is preferably high. Since the optical coupling is obtained as desired, optical signals are appropriately transmitted inside optical module 1, and optical module 1 can exhibit specified functions and performance.

When viewed from the Z-axis direction which is the normal direction of fifth surface 13 of optical hybrid device 10, first metallic pattern 23 and second solder 42 formed on first metallic pattern 23 are formed between two optical input ports 11 in the Y-axis direction. Fourth surface 12 of optical hybrid device 10 is joined to first metallic pattern 23 of third surface 22 of board 20 by melting and solidifying second solder 42. Therefore, board 20 and optical hybrid device 10 are fixed by first metallic pattern 23 that is formed between two optical input ports 11 in the Y-axis direction when viewed from the Z direction. Therefore, a region of second solder 42 included in first metallic pattern 23 is located between two optical input ports 11 in the Y-axis direction when viewed from the Z direction. By providing first metallic pattern 23 in this manner, it is possible to suppress a change in the distance between two optical input ports 11 when a temperature change occurs due to heating and cooling second solder 42. Therefore, when each of lenses 6b and 7b of array lens 6, 7 is aligned with a corresponding port of two optical input ports 11, the optical axis of each lenses 6b and 7b can be prevented from shifting from the optical axis of the corresponding port of optical input ports 11, thereby reducing an optical coupling loss. As a result, it is possible to stabilize the optical coupling and optical characteristics of optical module 1 against the temperature change.

As described above, the thickness of base 30 is, for example, 1.0 mm or greater and 2.0 mm or less. The thickness of base 30 is thicker than the thickness of optical hybrid device 10 and the thickness of board 20. For example, when board 20 is joined to first surface 31 of base 30 via first solder 41, base 30 is subjected to a temperature change due to melting and solidifying first solder 41. However, since base 30 is thick, warping is unlikely to occur, and changes in the positions of lenses 6b and 7b in the Z-axis direction in each of array lens 6, 7 due to the temperature change are negligibly small. Therefore, the optical coupling between array lens 6, 7 and optical input ports 11 of optical hybrid device 10 is stabilized by suppressing a shrinkage of the distance between two optical input ports 11 due to the temperature change.

Further, in optical module 1 according to the embodiment (example) in which a length (pitch P1) between two optical input ports 11 was set to 0.5 mm and first metallic pattern 23 was formed between two optical input ports 11 in the Y-axis direction, a simulation was performed for a case where a temperature change from 280° C. to 25° C. was given and board 20 was formed of aluminum nitride. As a result, in optical module 1 according to the embodiment, a shrinkage of the distance between two optical input ports 11 was suppressed to 0.2 μm or less. In this way, it is possible to reduce the shrinkage amount of the distance between two optical input ports 11.

Board 20 has a distance between second surface 21 and third surface 22 (a thickness of board 20 in the Z-axis direction). The distance between second surface 21 and third surface 22 is 300 μm or greater and 600 μm or less. Optical hybrid device 10 has a distance between fourth surface 12 and fifth surface 13 (a thickness of optical hybrid device 10 in the Z-axis direction). The distance between fourth surface 12 and fifth surface 13 is 50 μm or greater and 200 μm or less. First metallic pattern 23 has a width W in the Y-axis direction. Width W may be 20% or greater and 80% or less of the distance (pitch P1) between two optical input ports 11. In this case, when width W of first metallic pattern 23 is 80% or less of the distance between two optical input ports 11, it is possible to more reliably reduce a change in pitch P1 in the Y-axis direction between two optical input ports 11 due to the temperature change. In addition, when width W of first metallic pattern 23 is 20% or greater of the distance between two optical input ports 11, it is possible to more reliably reduce a warpage (positional change in the Z-axis direction) of optical hybrid device 10 caused by the temperature change. By suppressing the warpage of optical hybrid device 10, the positional deviation of two optical input ports 11 in the Z-axis direction with respect to lenses 6b and 7b can be suppressed, and the optical coupling between two optical input ports 11 and lenses 6b and 7b can be stabilized.

Board 20 includes aluminum nitride as a material. Second solder 42 includes a gold-tin alloy as a material. Optical hybrid device 10 may include indium phosphide as a material. In this case, board 20 includes aluminum nitride as a material, which can increase a thermal conductivity of board 20 to improve a heat dissipation performance of board 20. In addition, second solder 42 includes a gold-tin alloy as a material, which can increase the reliability of the joining.

An optical module according to the modification includes board 20A in which second metallic pattern 24A having a U-shape is formed. When viewed from the Z-axis direction, 90-degree hybrid 15 is located within a region surrounded by U-shaped second metallic pattern 24A. Second metallic pattern 24A is formed so as to surround 90-degree hybrid 15 except in a direction towards first metallic pattern 23. Second metallic pattern 24A further includes side portion S that extends in the Y-axis direction, as compared to second metallic pattern 24. When board 20A is viewed from the Z-axis direction, side portion S and optical hybrid device 10 have the overlapping region. The overlapping region is connected to side portion S by second solder 42, so that optical hybrid device 10 is securely fixed onto board 20. A length (width) in the Y-axis direction of the overlapping region between side portion S and optical hybrid device 10 may be 50 μm or greater, for example. As described above, since second metallic pattern 24A is formed so as to surround 90-degree hybrid 15, a residual stress applied to 90-degree hybrid 15 due to a temperature change during heating and cooling of second solder 42 can be more effectively relaxed.

Embodiments of an optical module according to the present disclosure have been described above. However, the present invention is not limited to the embodiment described above. That is, it is easily understood by those skilled in the art that various modifications and changes can be made to the present invention within the scope of the gist described in the claims. For example, in the embodiment described above, an example in which board 20 includes two patterns of first metallic pattern 23 and second metallic pattern 24 has been described. However, the form of patterns formed on the board is not limited to first metallic pattern 23 and second metallic pattern 24, and can be appropriately changed. The configuration of each optical component of optical component 5 can also be appropriately changed. Further, in the embodiment described above, optical module 1 in which P1 is 0.5 mm, W is 0.1 mm or greater and 0.4 mm or less, and length L1 is 0.3 mm or greater and 0.6 mm or less has been described. However, the size, shape, material, and arrangement of each part of the optical module can be appropriately changed.

What is claimed is:

1. An optical module comprising:
   a base having a first surface;
   a board having a flat-plate-like outer shape extending in a first direction, the board having a second surface and a third surface located reverse to the second surface, the second surface being joined to the first surface of the base by using a first solder, the third surface including a first metallic pattern and a second metallic pattern each of which is made of a metal, the first metallic pattern and the second metallic pattern being arranged in the first direction relative to each other;
   an optical circuit element having a flat-plate-like outer shape extending in the first direction, the optical circuit element having a fourth surface and a fifth surface located reverse to the fourth surface, the optical circuit element having two ports at one end of the fifth surface in the first direction, the two ports being arranged in a second direction crossing the first direction, the fourth surface being joined to the first metallic pattern and the second metallic pattern of the board by using a second solder; and an array lens in which two lenses are arranged in the second direction, the array lens being fixed onto the first surface of the base so that one of the two lenses is optically coupled to one of the two ports of the optical circuit element and other of the two lenses is optically coupled to other of the two ports of the optical circuit element, wherein, when the two ports, the first metallic pattern, and the second metallic pattern are seen from a normal direction of the fifth surface, the first metallic pattern is formed closer than the second metallic pattern to the one end of the optical circuit element in the first direction and is formed between the two ports in the second direction.

2. The optical module according to claim 1, wherein the optical circuit element is included inside of the board when the board and the optical circuit element are seen from the normal direction.

3. The optical module according to claim 1, wherein the board has a distance of 300 μm or greater and 600 μm or less between the second surface and the third surface of the board, wherein the optical circuit element has a distance of 50 μm or greater and 200 μm or less between the fourth surface and the fifth surface of the optical circuit element, and wherein the first metallic pattern has a width in the second direction, and the width is 20% or greater and 80% or less of a distance in the second direction between the two ports.

4. The optical module according to claim 1, wherein, when seen in a plan view from the normal direction, the first metallic pattern has a length of 0.3 mm or greater and 0.6 mm or less in the first direction, and the second metallic pattern has a length of 0.3 mm or greater and 0.6 mm or less in the first direction.

5. The optical module according to claim 1, wherein the board includes aluminum nitride as a material, wherein each of the first solder and the second solder includes a gold-tin alloy, and wherein the optical circuit element includes indium phosphide as a material.

6. The optical module according to claim 1, wherein the second metallic pattern further includes a side portion extending in the first direction toward the first metallic pattern from both ends of the second metallic pattern in the second direction, wherein the side portion has an overlapping region overlapping the optical circuit element when the optical circuit element and the board are seen from the normal direction, and wherein the second solder is formed to include the overlapping region on the second metallic pattern.

7. The optical module according to claim 6, wherein the board has a distance Ls from the side portion to the two ports in the first direction, and the distance Ls is greater than $0.5 \times L1$ and less than $1.5 \times L1$, where L1 is a length of the first metallic pattern in the first direction.

* * * * *